United States Patent Office 3,145,537
Patented Aug. 25, 1964

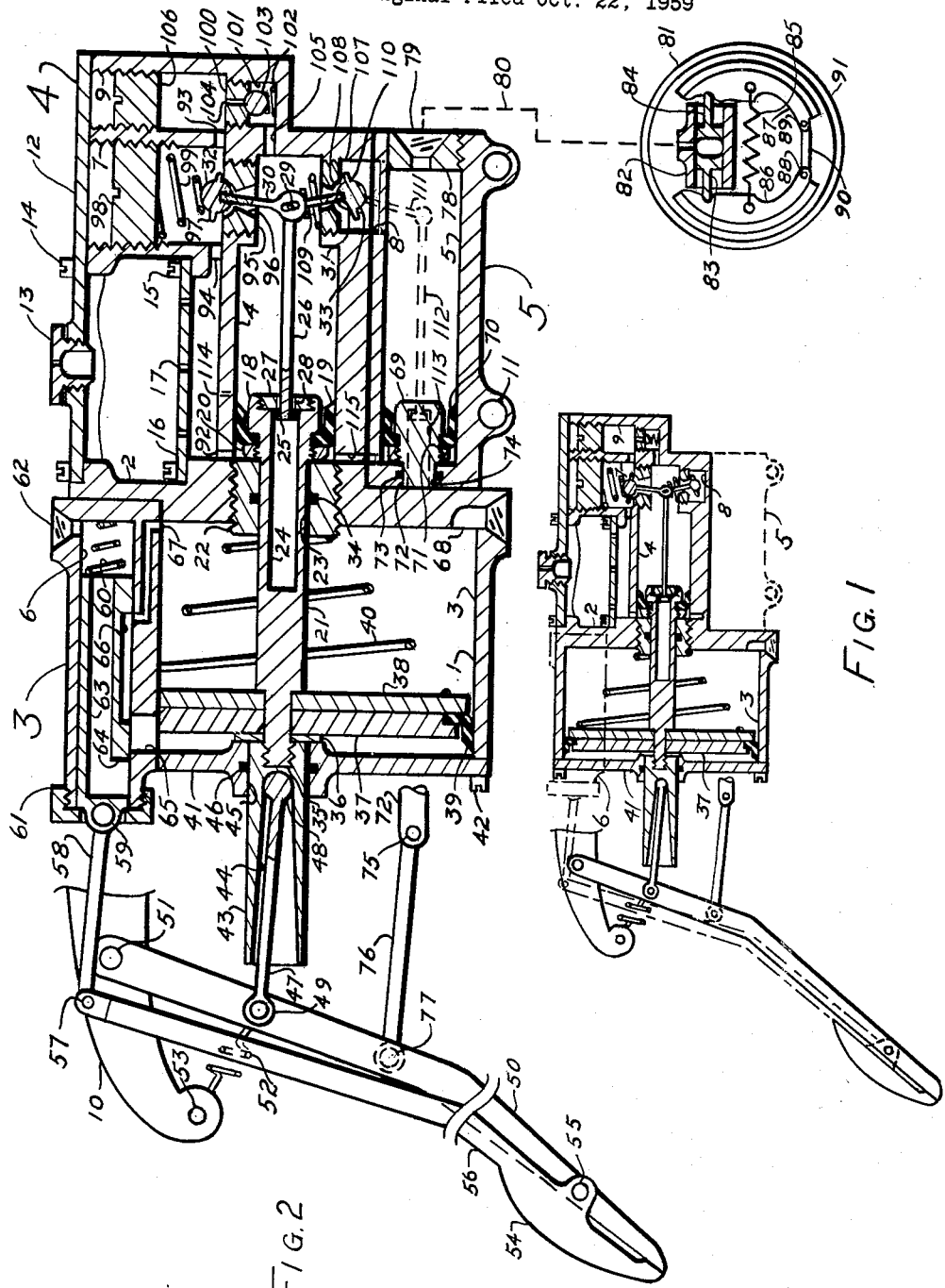

3,145,537
VEHICLE CONTROLS
Raymond C. Strauss, 301 W. Lanawee, Lansing, Mich.
Original application Oct. 22, 1959, Ser. No. 848,144.
Divided and this application Aug. 22, 1963, Ser. No. 304,304
5 Claims. (Cl. 60—54.6)

The present invention relates to improvement in motor vehicle controls and particularly relates to improvements disclosed and claimed in application Serial Number 848,144, filed October 22, 1959, now abandoned of which this application is a division. In both this application and application Serial Number 848,144 brake operating methods are shown for bringing the wheel shoes of a vehicle into contact with the wheel drums at a low leverage, high fluid volume, fast-acting rate, thereupon shifting to a higher leverage, lower fluid volume, for increased hydraulic leverage in order to set the brakes manually with ease through the use of an unusually short total brake pedal movement.

One of the primary objects of this invention is to provide two master cylinder pistons in a fluid braking system so that when the driver initially depresses the brake pedal one of the pistons, normally power assisted, will operate to bring the shoes against the drums, whereupon the second piston will act in sequence to manually set the brakes.

Another object of this invention is to provide an arrangement wherein when no power assistance is available the two pisons will operate simultaneously to bring the shoes against the drums, whereupon the second piston will act alone to set the brakes.

Another object of this invention is to provide a brake pedal which, when in a released position, will have slack space between itself and the first piston so that during the elimination of the slack by the initial pressure of the driver's foot upon the pedal the assisting power will operate the first piston, and upon complete elimination of the slack then further pressure by the driver's foot upon the pedal will manually operate the second piston for effective brake action and a vehicle stop.

Another object of this invention is to provide an arrangement wherein, with assisting power available so that the first piston operates ahead of the second piston will serve as a confining wall for the fluid being power propelled toward the wheel shoes, and with the completion of the powered movement of the first piston the second piston will be backpressured for the engaged shoes and drums, causing any movement of the second piston away from its released position to press firmly on the confined fluid and so upon the engaged shoes and drums for a vehicle stop.

Another object of this invention is to provide a valving arrangement which will yield with the contact of the drums against the shoes so that excessive fluid being propelled in the operation will be diverted to the fluid reservoir.

Another object of this invention is to provde a check valve between the first and second pistons so that when the shoes have been moved to the drums the fluid ahead of the check valve will be locked against escape and the shoes and drums will remain in contact for manual pressuring by the second piston toward a vehicle stop.

Another object of this invention is to provide a fluid compensating valve which shall allow free return of the powerized piston to its released position regardless of the volume of fluid propelled into the system for engaging the shoes with the drums.

Another object of this invention is to provide a baffle in the lower portion of the fluid reservoir so that returning fluid surging into the reservoir will be largely confined below the baffle and the surface of the reservoir fluid will remain undisturbed, thereby discouraging the introduction of air into the system.

Another object of this invention is to provide in the power assisting mechanism supplementary spring pullback means to provide substantial supportability for the weight of the driver's foot if he chooses to ride the brake, the supplementary spring withdrawing when the power assisting mechanism is operated.

Another object of this invention is to provide a control valve for the powerizing mechanism which will have high pressure passages therein of greater volumetric capacity for operating the mechanism from a released position than lower pressure passages for the return of the mechanism to the released position, thereby guaranteeing instant shoe-to-drum movement by the time the pedal slack is fully eliminated, the said high pressure passages being of such ample size that the mechanism operates instantly with maximum power and speed throughout its path of movement.

Other objects and features of the invention will appear upon consideration of the drawings wherein like reference characters refer to like parts throughout the views.

In the drawings:

FIG. 1 is a cross-sectional view of a vacuum powered embodiment of this invention coupled to a typical wheel brake assembly, the embodiment being disposed upon three levels: III, near; IV, withdrawn; and V, remote.

FIG. 2 is a cross-sectional view of withdrawn level IV, near level III being shown in dot-dash lines, and remote level V being shown in dash lines.

Referring now to FIG. 1, there is shown a housing assembly 1 which is a form of the mechanism wherein power is employed to automatically bring the wheel shoes of the vehicle into contact with the wheel drums before manual effort is used to pressure the shoes against the drums for a vehicle stop. The housing is composed of a hydraulic fluid reservoir 2, a vacuum cylinder 3, a low pressure hydraulic fluid cylinder 4, a high pressure hydraulic fluid cylinder 5, a vacuum controlling slide valve cylinder 6, low and high pressure check valve chambers 7 and 8, and pressure compensating check valve chamber 9. A brake support arm 10 is formed integrally with the housing, and the housing containing these components is securely mounted to the frame of the vehicle by screws, not shown, through tab ears 11 formed on the surface of the housing.

Reservoir 2 is capped by coverplate 12 which extends over check valve chambers 7 and 9, and which carries threaded and vented inspection-filler plug 13. Screws 14 attach the cover-plate to the housing and screws 15 attach baffle plate 16 within the reservoir to the housing, the baffle plate being perforated with openings 17 for communication of the dormant fluid area above the plate with the frequently displaced fluid below the plate.

A piston 18 rides in low pressure cylinder 4 on piston ring 19, gripped to the piston by means of threaded collar 20, the piston terminating in piston rod 21 which passes through a threaded plug 22 in housing 1 by way of bearing opening 23 into vacuum cylinder 3. The piston and rod are drilled from the face of the piston with opening 24 into which loosely slides the threaded T-end 25 of shaft 26. A plug 27 threads into the end of piston 17 and passes shaft 26 through its opening 28. The opposite end of shaft 26 terminates in elongated eye 29 for connection to rockable arms 30 and 31 threaded respectively into check valve balls 32 and 33.

Piston rod 21 is sealed against passage of fluid by packing 34 in plug 22 and is reduced in diameter at threaded section 35 for the washer 36 behind which is compressed vacuum piston 37 and plate 38 for gripping piston ring 39 sliding in housing 3. An expansion spring 40 is disposed between plate 38 and plug 22 for urging piston 37 to a released position against vacuum cylinder end plate 41 held to housing 1 by screws 42. A shaft 43, having a conical concave recessed area 44 is passed through bearing opening 45 of end plate 41 and packing 46 to threadably engage section 35 of piston rod 21. A connecting rod 47 seats at its enlarged spherical end 48 in recessed area 44 and at its other end connects at eye 49 with brake arm 50 pivoting at 51 on arm 10. A spring 52, connecting between eye 53 on the end of arm 10 and eye 49, tends to pull brake arm 50 toward a released position.

A tiltable pedal 54 rides on brake arm 50 at point 55 and projects upwardly with a lever arm 56 at the end of which eye opening 57 engages a connecting rod 58 in vacuum control cylinder 6, the tiltable pedal being urged to an untilted position by spring 60 bearing against the inner end of slide valve 59. The outer end of cylinder 6 is encased by apertured end cap 61 and the inner end of cylinder 6 communicates with outside air at atmospheric pressure through port 62. Slide valve 59 is drilled axially from its inner end with port 63 which terminates in leg 64 through the sidewall of valve 59 for registry at times with port 65 between the side of valve cylinder 6 and one end of vacuum cylinder 3. An elongated cut 66 in the surface of slide valve 59 normally registers, when the slide valve is pressed against end cap 61, with ports 65 and smaller capacity S-shaped port 67 connecting between cylinder 6 and the opposite ends of vacuum cylinder 3. A port 68 connects with a source of vacuum the vacuum cylinder 3 at its end adjacent port 67 so that with slide valve 59 in the position shown in FIG. 1 piston 37 rests in its released position with equal vacuum tension upon its two faces due to passage of vacuum through port 67, cut 66 and port 65.

A piston 69 rides in high pressure cylinder 5 on piston ring 70 gripped to the piston by threaded collar 71. A piston rod 72 is formed with the piston 69 to project through the seal 73 in bearing opening 74 along the side of vacuum housing 3 in assembly 1 for connection at its outer end via eye 75 with rod 76, the rod 76 being joined at its opposite end with brake arm 50 via eye opening 77. An end plug 78 threaded into the housing at the opposite end of cylinder 5 carries threaded port 79 for connection to a conduit 80, shown in broken lines, leading to a typical drum type wheel brake assembly which is one of the usual four on a vehicle and is numbered 81. Conduit 80 connects with wheel cylinder 82 so that when pressure is applied to the fluid therein the pistons 83 and 84 receiving the pressure will expand spring 85 and will pivot brake shoes 86 and 87 around their pivot points 88 and 89 on bar 90 in order to frictionally engage the shoes 86 and 87 with the drum 91 for a vehicle stop.

Low pressure port 115 connects cylinder 5 with cylinder 4 behind released pistons 69 and 18 while low pressure port 92 connects cylinder 4 with reservoir 2 for unrestrained movement of the pistons from the released position. Ports 93 and 94 connect compensating and check valve chambers 7 and 9 with the reservoir. Plug 95, threaded into the lower end of chamber 7, forms at its upper surface a seat in opening 96 for relief check valve ball 32. Ball 32 carries a belt-ring 97 to serve as a point of fulcrum when rockable arm 30 is rocked to unseat the ball from engagement with opening 96. A plug 98 of larger diameter than 95 threads into the upper end of chamber 7 to pressure a spring 99 against ball 32.

A plug 100 threads into the lower end of compensating check valve chamber 9 to form below its lower surface small check ball chamber 101 wherein a spring 102 positions and pressures ball 103 over the center opening 104 through plug 100. A port 105 connects chamber 101 with low pressure cylinder 4, and a plug 106 larger than plug 100 threads into the upper end of chamber 9 so that fluid from reservoir 2 may be drawn only through ports 94 and 93 when check ball 103 is unseated by differential pressure between cylinder 4 and reservoir 2.

A plug 107 smaller in diameter than plug 95 threads into the housing between low pressure cylinder 4 and high pressure cylinder 5. Locking check ball 33 seats against the lower face of plug 107 at opening 108 therethrough. Rockable arm 31 threaded into ball 33 is urged upwardly by spring 109 in cylinder 4, and belt-ring 110 on ball 33 serves as a point of fulcrum to break the seal of the ball against seat opening 108 when arm 31 is rocked, both rockable arms 30 and 31 assuming a rocked position when piston 18 is in a fully released position and shaft 26 pulls them from perpendicular positions, as shown in FIG. 1.

In the operation of the mechanism so far described the brake arm 50 and the brake pedal 54 are shown to be in their fully released positions. If, with the vehicle in motion and the motor operating, the driver's foot is now pressured against pedal 54 and above pivot point 55, arm 56 will rotate clockwise to move slide valve 59, through endward movement of connecting rod 58, away from end cap 61 and to compress spring 60 in order to lock off communication of port 65 with cut 66 and S-shaped port 67. Further clockwise movement of arm 56 will bring eye 57 directly over brake arm pivot point 51 and will expose port 65 to incoming air at atmospheric pressure so that the resulting differential pressure condition between the faces of piston 37 will cause the air in cylinder 3 adjacent end plate 41 to compress spring 40 and move piston 37 toward plug 22. In this rapidly executed movement piston rod 21 is driven to move hydraulic piston 18 across low pressure cylinder 4 freeing link 28 of endward tension and allowing both pressure relief check ball 32 and high pressure locking check ball 33 to fully seat. Fluid propelled ahead of piston 18 then is driven to unseat locking check ball 33, compressing positioning spring 109 so that fluid passes through chamber 8 and through port 79 of end plug 78 to conduit 80 to move the wheel cylinder pistons 83 and 84 away from each other, thereby causing shoes 86 and 87 to contact rotating wheel drum 91. Reactionary pressure from this contact of shoes-to-drums is sufficient to backpressure the advancing fluid in cylinder 4 so that spring 99, tensioned to yield at this backpressure, permits relief check valve 32 to unseat and allow the balance of the propelled fluid not needed for further movement of the shoes to escape through opening 96, chamber 7 and port 94 to reservoir 2.

As soon as the relief check valve 32 becomes unseated, locking check valve 33 seats to lock the fluid in wheel cylinder 82 between pistons 83 and 84 in conduit 80, high pressure cylinder 5, and chamber 8, so that the wheel brake shoes 86 and 87 remain in contact with the wheel drum 91. Relief check valve 32 again seats after low pressure piston 18 has reached the limits of its forward movement by arriving at the end of the cylinder, link 28 moving meanwhile into area 24 of piston rod 21.

With eye 57 located directly over pivot point 51, slide valve 59 is in a based position against fully compressed spring 60. In this position and with piston 37 already away from end plate 41 pedal arm 56 and brake arm 50 are free to rotate counterclockwise, so that the end ball 48 of connecting rod 47 moves along the inner surface of conical recessed area 44 in pursuit of piston 37, and connecting rod 76 moves rod 72 and piston 69 to pressure the fluid within cylinder 5, and with ball 33 locked against its port seat 108 in chamber 8 to, in turn, pressure the wheel brake shoes 86 and 87 against rotating drum 91, with which they are already in contact, for a vehicle stop. Since here, as with a typical master cylinder, the largest amount of the fluid displaced is used for moving the shoes to the drums, it becomes obvious that with the shoe-to-drum movement accomplished automatically the brake arm 50 can be moved only slightly and the feeling under the driver's foot becomes one of pressuring alone rather than moving the brake arm (to bring the shoes to the drums) and pressuring.

If the driver's foot is now relaxed to relieve pressure on high pressure piston 69 and to allow spring 60 to expand and drive pedal 54 to an untilted position, it will be seen that air through port 65 to the back face of piston 37 will be cut off and slot cut 66 of slide valve 59 will be shifted to intercommunicate port 65 with S-shaped port 67 so that piston 37 will be subjected to equal vacuum pressure on both faces, and spring 40 will be freed to drive piston 37 and piston 18 to their released positions.

As piston 18 moves toward its released position a lower-than atmospheric pressure develops in cylinder 4 so that check ball 103 is moved from its seat by inrushing fluid through chamber 9, port 93, chamber 7, port 94 from reservoir 2 exposed to atmospheric pressure, permitting piston 18 to return to its released position without restriction. As the piston 18 approaches its released position, T-end 25 on link 26 engages plug 27 causing arms 30 and 31 to simultaneously rock check balls 32 and 33 on their respective belt-rings 97 and 110 thereby permitting fluid locked in the wheel cylinder 82 between pistons 83 and 84 to return via conduit 80, cylinder 5, chamber 8, cylinder 4, and chamber 7 to the reservoir 2 so that the spring 85 in the wheel brake assembly 81 may contract to pull the shoes 86 and 87 away from contact with the drum 91.

In the event the motor is not operating the driver may apply pressure to the brake pedal 54 in the manner already explained so that the pedal will be tilted clockwise ineffectively to thrust brake arm 50 downwardly for counterclockwise rotation. In the movement of the brake arm both rods 47 and 76 will be moved together and fluid will be propelled from both cylinders 4 and 5 to lift check ball 33 from its seat for passage of the fluid through conduit 80 to move wheel cylinder pistons 83 and 84 away from each other and bring shoes 86 and 87 into contact with drum 91. Reactionary pressure from the contact of the shoes with the drum causes spring 99 in chamber 7 to yield to fluid in cylinder 4 attempting to unseat the relief check valve ball 32 for return to the reservoir 2. Check ball 32 in yielding permits check ball 33 to seat and lock thereby trapping the fluid holding shoes 86 and 87 against drum 91. Continued counterclockwise rotation of brake arm 50 now permits piston 69 alone to pressure fluid against wheel pistons 83 and 84 for a vehicle stop while the fluid ahead of piston 18 returns to reservoir 2.

The fluid at the back faces of pistons 18 and 69, as they advance, comes not only from the reservoir 2 above baffle plate 16 via ports 92 and 115 but also from the volume of fluid returning through port 94 so that there is only an up and down surge of fluid through perforated openings 17 in plate 16, minimizing the disturbance of the surface of the fluid in the reservoir and therefore minimizing the tendency for air bubbles to enter the system.

The greater width of port 65 than S-shaped port 67 at its point of connection with cylinder 6 guarantees instant response and movement of piston 37, under powered conditions, away from end wall 41 even before the leg 64 of airport 63 has fully registered with port 65 and before pivot point 57 has fully centered itself over pivot point 51, so that end 48 of shaft 47 is already separated from the apex seat of concave recessed area 44 by the time subsequent counterclockwise movement of brake arm 50 begins for pressuring the drum engaged shoes to effect a vehicle stop.

In summary, it should be pointed out where appropriate seals are not shown in these drawings they logically will be included in production units, that diameters of related powerized pistons and responsive hydraulic pistons are not necessarily correct for actual operation, and that stroke lengths of pistons are not necessarily adjusted for actual operation, the purpose of the drawings being limited to the delineation of the actions. It is expressly understood that the illustrated and described details do not limit the scope of the invention, and that various changes may be made in the design and arrangement of parts without departing from the spirit, as will readily be understood by those skilled in the art.

What is claimed is:

1. In a vehicle braking system the combination of a brake arm carrying pedal yieldable to bottom on said brake arm, a fluid reservoir connecting with the lines of said system, first and second cylinders and plungers between said reservoir and the operably responsive wheel brake shoes of said system, first and second rods attached to their respective plungers and projecting through seals for endward alignment with said brake arm and for contact therewith so that in the respectively released positions of said plungers with attached rods and said brake arm a slack space appears between said brake arm and pedal, power assisting means connected to said first plunger and instantly operable at full capacity throughout its path of travel when said slack space is manually eliminated by shifting a control valve connected to said pedal whereby said first plunger is moved by said power assisting means to propel into the system a volume of fluid for bringing the wheel brake shoes into contact with the wheel drums, relief valve means to hold the propelled fluid against return to the reservoir until the shoes have contacted the drums whereupon the relief valve means yields to permit excess fluid to return to the reservoir, locking off means to hold said fluid used to hold said shoes and drums in contact, said locking off means being located between said first and second plungers so that with further manual pressure applied to said brake pedal the said second plunger and rod will be moved manually against said locked fluid backpressuring against said locking off means to firmly engage said shoes and drums for a vehicle stop, and fluid compensating valve means to allow unrestricted return of the first plunger to its released position, and projections on said relief valve means and locking off means for engaging a protrusion on one of said plungers when in its released position so that these valve means become tilted and their seals are broken for reestablishment of fluid connection between said reservoir and brake shoes.

2. In a vehicle braking system the combination of a fluid reservoir, first and second cylinders and plungers to pressure the fluid for engagement of the wheel shoes with the wheel drums of the system for a vehicle stop, said plunger being connected to a brake arm, a manually operable thrust surface yieldable to bottom on said brake arm, for pressuring said plungers, separate return springs for said plungers and said thrust surface to cause in the fully released position of said surface a slack space to appear between said surface and said brake arm, a power assisting control valve connected to said pedal, power assisting means operable instantly at maximum power and speed throughout its prescribed path of movement for moving said first plunger and locking off a sufficient volume of fluid to engage and hold together the wheel brake shoes and drums when said slack space is eliminated, and further movement of said brake arm moving said second plunger to further pressure said locked off fluid for a vehicle stop when said thrusting surface is further pressured after elimination of said slack, means for breaking the seal of said locked off fluid upon release of said brake arm, and follow-up means connected with said first plunger and said brake arm so that with failure of power assisting means said follow-up means will cause said first and second plungers to operate coincidentally for moving and locking off sufficient volume of fluid for the engagement of said shoes and drums whereupon said second plunger will operate alone to pressure said engaged shoes and drums for a vehicle stop.

3. In a vehicle braking system the combination of a brake arm carrying a pedal yieldable to bottom on said brake arm, fluid occupying a reservoir and said braking system connecting therewith, first and second cylinders and plungers between said reservoir and system, said plunger being connected to said brake arm, separate resilient means for normally urging said plungers to their respective released positions so that together the resilient means of said plungers will substantially support the weight of the operator's foot riding said pedal, a power assisting control valve connected to said pedal, power assisting means operating instantly at full capacity throughout its path of movement and responsive to bottoming of said pedal on said brake arm for withdrawing the first resilient supporting means and moving said first plunger to move and lock off from the reservoir an operating portion of said fluid so that said first plunger may propel at least a portion of said locked off fluid toward the wheel shoes in order to bring the shoes into contact with the wheel drums of the system, said second plunger in a released position serving as a backstop for the locked off fluid during the movement of the shoes to the drums and for the backpressuring fluid after the movement is completed, and movement of said brake arm moving said second plunger and compressing its resilient means in order to further pressure said portion of said locked off fluid to effect a vehicle stop when said brake arm is moved by further manual pressure applied to said pedal, means for breaking the seal of said portion of locked off fluid upon release of said pedal, and follow-up means connected with said first plunger so that with failure of power assisting means and movement of said brake arm and said follow-up means will cause said first and second plungers to add resistance to their separate resilient means to operate coincidentally for moving and locking off sufficient fluid to engage said shoes and drums whereupon said second plunger will operate alone to pressure said engaged shoes and drums for a vehicle stop.

4. In a vehicle braking system the combination of a brake arm carrying a pedal yieldable to bottom on said brake arm, fluid occupying a reservoir and said braking system, first and second cylinders and plungers between said reservoir and system, a power assisting control valve connected to said pedal, power assisting means responsive while bottoming of said pedal on said brake arm for moving said first plunger to lock off from the reservoir an operating portion of fluid and for propelling the locked off fluid toward the shoes in order to bring the shoes against the wheel drums of the braking system, said second plunger in its released position serving as a backstop for the locked off fluid during the movement of the shoes to the drums and for the backpressuring fluid after the movement is completed, and movement of said brake arm moving said second plunger to further pressure said locked off fluid to effect a vehicle stop, when said brake arm is moved by further manual pressure applied to said pedal, means for breaking the sail of said locked off fluid upon release of said pedal, and follow-up means connected with said first plunger and brake arm so that with failure of power assisting means and movement of said brake arm and said follow-up means will cause said first and second plungers to operate coincidentally for moving and locking off sufficient volume of fluid for the engagement of said shoes and drums whereupon said second plunger will operate alone to pressure said engaged shoes and drums for a vehicle stop.

5. Vehicle brake actuating mechanism comprising, in combination, a housing having a primary brake operating cylinder with an operating piston therein, a secondary hydraulic brake operating cylinder with an operating piston therein, said secondary cylinder having an outlet passage opening into the end of the primary cylinder remote from the primary piston when in a released position, a piston rod secured to said secondary piston, a smaller rod telescoping into an axially drilled opening through the face of said secondary piston into said piston rod, said telescoping rod limited in endward movement therein by a T-end abutting an apertured plug at the face of said piston, said passage between primary and secondary cylinders containing a check valve assembly wherein a check valve seat faces said primary cylinder, a check valve positioned by a spring against said seat, a lever bumper on one side of said check valve and a link attached to said check valve to project through said seat opening and in link connection with the end of said telescoping rod so that when said secondary piston is in a released position said telescoping rod tilts said check valve against its bumper to prevent seating of said check valve, and when said piston is moved from its released position said check valve is permitted to seat, a fluid pressure actuator cylinder coaxial with the secondary cylinder, said piston rod extending through the actuator cylinder, an actuator piston in the actuator cylinder mounted on and secured to said rod for joint movement therewith whereby actuation of the actuator piston operates the secondary piston, a vacuum port for furnishing vacuum to one side of the actuator piston, ports at opposite ends of said actuator cylinder connecting separately through the cylindrical wall of a cylindrical housing for a vacuum control valve, a valve having a passageway lengthwardly of the surface of said control valve for connecting said ports to normally vacuum suspend said actuator piston, spring means for urging said actuator piston away from said secondary cylinder, an airport in said vacuum control valve to register with the one of said ports remote from said secondary cylinder, spring means for urging said control valve into communicating registry of said valve passageway with said ports while blocking off said airport from said remote port, so that if said control valve is shifted endwardly to register said air port with said remote port, then atmospheric pressure passing therethrough will cause differential pressure to move said actuator piston toward said secondary cylinder, one of said ports being substantially greater in diameter than the port adjacent said secondary cylinder so that movement of the actuator piston toward the secondary cylinder will be substantially more rapid than its movement away from said secondary cylinder thereby assuring quicker response to differential pressure movement than to the spring-induced vacuum-suspended movement, a brake pedal arm pivoted on an extension of the housing and carrying a tiltable treadle held by a spring in a retracted position, a rod connecting an extension of said tiltable treadle with said control valve, tilting of said treadle operating said control valve to shift said valve passageway from registry with said ports and to register said airport with the one said port remote from said secondary cylinder for atmospheric pressure against one side of said actuator piston whereby the spring means of said actuator piston is overcome and the actuator piston operates the secondary piston, a rod coaxial with said secondary piston rod attached to said actuator piston for projection through an end wall of said secondary cylinder, a connecting rod between said brake pedal arm and a cone-shaped receptacle in said coaxially located actuator rod for endward contact with the base of said cone, a connecting rod between said brake pedal arm and the outwardly projecting primary piston rod, a source of hydraulic fluid for said secondary cylinder, valve means controlling flow from said source to the secondary cylinder, said valve means being arranged to cut off flow until the secondary piston has moved a predetermined distance, said valve means opening upon backpressure created through the engagement of the brake shoes with the brake drums whereby more fluid moved by the secondary piston is bypassed to the source, and a baffle in a reservoir area for said source of hydraulic fluid to separate the returning flow of fluid to the source from impinging on the fluid already in the reservoir, the latter being exposed on its surface to atmospheric pressure, said baffle preventing turbulence of said surface and preventing the introduction of air bubbles to the fluid body.

No references cited.